(12) United States Patent  
Belliveau

(10) Patent No.: US 7,018,047 B2
(45) Date of Patent: Mar. 28, 2006

(54) IMAGE PROJECTION LIGHTING DEVICE WITH VARIABLE HOMOGENEITY

(76) Inventor: Richard S. Belliveau, 10643 Floral Park, Austin, TX (US) 78759

( * ) Notice: Subject to any disclaimer, the term of this patent is extended or adjusted under 35 U.S.C. 154(b) by 104 days.

(21) Appl. No.: 10/766,137

(22) Filed: Jan. 27, 2004

(65) Prior Publication Data

US 2005/0162097 A1    Jul. 28, 2005

(51) Int. Cl.
G03B 21/22    (2006.01)

(52) U.S. Cl. ............................. 353/47; 353/48; 353/49
(58) Field of Classification Search ............... None
See application file for complete search history.

(56) References Cited

U.S. PATENT DOCUMENTS

| | | | |
|---|---|---|---|
| 5,113,332 A | 5/1992 | Richardson | 362/282 |
| 5,828,485 A | 10/1998 | Hewlett | 359/291 |
| 5,829,868 A | 11/1998 | Hutton | 362/276 |
| 5,988,817 A | 11/1999 | Mizushima et al. | 353/94 |
| 6,057,958 A | 5/2000 | Hunt | 359/291 |
| 6,099,128 A | 8/2000 | Jessl | 353/51 |
| 6,188,933 B1 | 2/2001 | Hewlett et al. | 700/19 |
| 6,208,087 B1 | 3/2001 | Hughes et al. | 315/291 |
| 6,219,093 B1 | 4/2001 | Perry | 248/135 |
| 6,412,972 B1 | 7/2002 | Pujol et al. | 362/272 |
| 6,588,944 B1 | 7/2003 | Harris | 385/88 |
| 6,671,005 B1 | 12/2003 | Pujol et al. | 348/771 |
| 6,765,544 B1 | 7/2004 | Wynne Willson | 345/6 |
| 6,910,777 B1 * | 6/2005 | Ito | 353/31 |

OTHER PUBLICATIONS

Website: http://www.tlt.co.jp/tlt/art/catalogue/av/avjr.htm.
Catalyst DL1 brochure.

* cited by examiner

*Primary Examiner*—Tuyet Thi Vo
(74) *Attorney, Agent, or Firm*—Walter J. Tencza, Jr.

(57) ABSTRACT

An image projection lighting device is provided which includes a variable homogenizing system. The variable homogenizing system may homogenize light projected by a lamp across a light valve. The variable homogenizing system may vary the light across the light valve from an existing state to a first state or from an existing state to a second state. The variable homogenizing system may be comprised of one or more lens arrays, which may be comprised of cylindrical or spherical lenses.

18 Claims, 8 Drawing Sheets

FIG 4A
FIG 4B
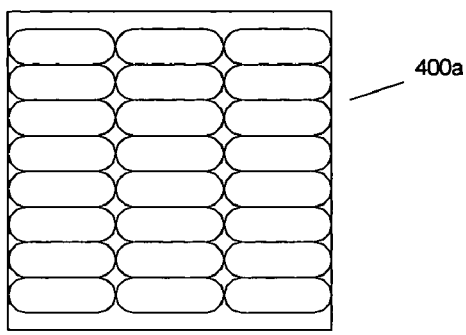
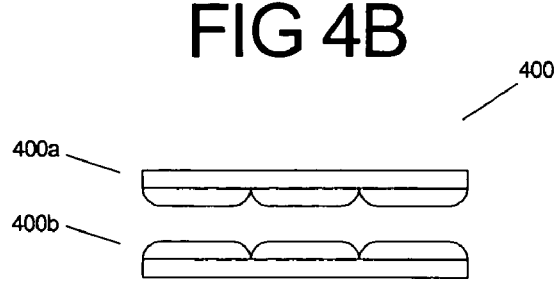

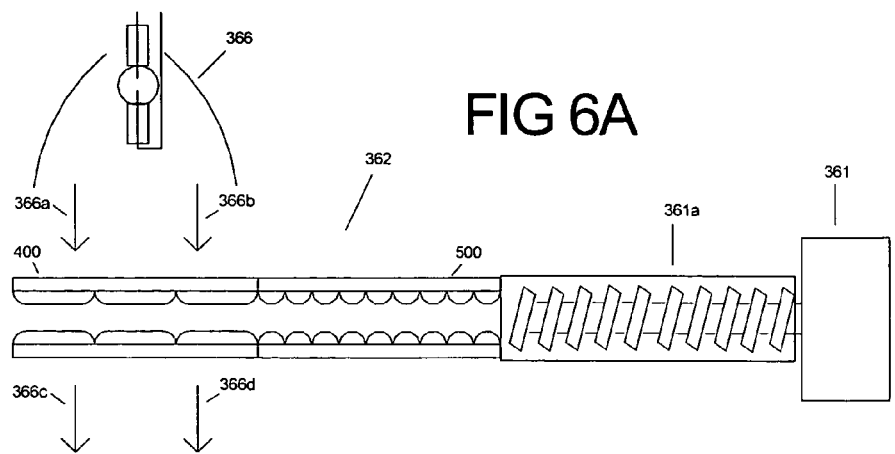
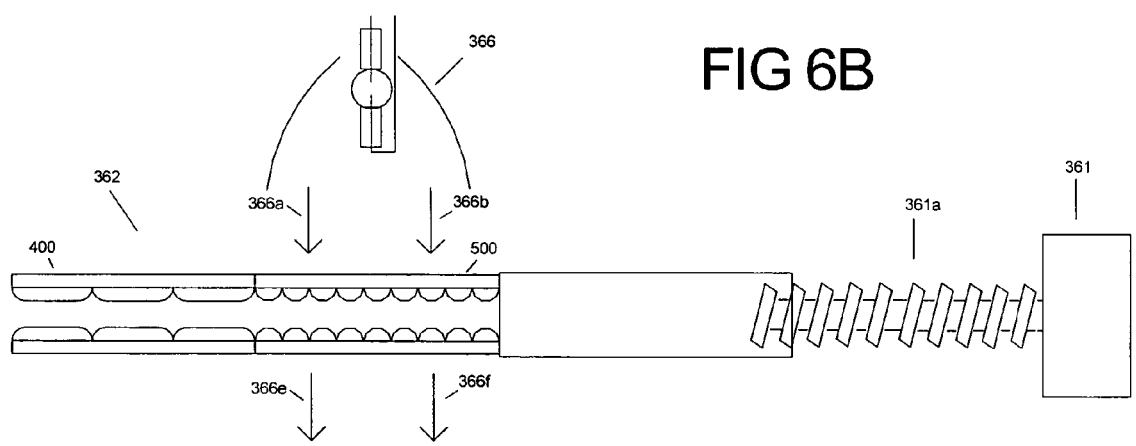

IMAGE PROJECTION LIGHTING DEVICE WITH VARIABLE HOMOGENEITY

FIELD OF THE INVENTION

The present invention relates to image projection lighting devices.

BACKGROUND OF THE INVENTION

Lighting systems in the prior art are typically formed by interconnecting, via a communications system, a plurality of lighting fixtures and providing for operator control of the plurality of lighting fixtures from a central controller. Such lighting systems may contain multiparameter light fixtures, which illustratively are light fixtures having two or more individually remotely adjustable parameters such as focus, color, image, position, or other light characteristics. Multiparameter lighting fixtures are widely used in the lighting industry because they facilitate significant reductions in overall lighting system size and permit dynamic changes to the final lighting effect. Applications and events in which multiparameter lighting fixtures are used to great advantage include showrooms, television lighting, stage lighting, architectural lighting, live concerts, and theme parks. Illustrative multi-parameter light devices are described in the product brochure entitled "The High End Systems Product Line 2001" and are available from High End Systems, Inc. of Austin, Tex.

A variety of different types of multiparameter light fixtures are available. One type of advanced multiparameter lighting fixture is an image projection lighting device ("IPLD"). Image projection lighting devices of the prior art typically use a light valve or light valves to project images onto a stage or other projection surface. A light valve, which is also known as an image gate, is a device for example such as a digital micro-mirror ("DMD") or a liquid crystal display ("LCD") that forms the image that is projected. Either a transmissive or a reflective type light valve may be used. U.S. Pat. No. 6,057,958, issued May 2, 2000 to Hunt, incorporated herein by reference, discloses a pixel based gobo record control format for storing gobo images in the memory of a light fixture. The gobo images can be recalled and modified from commands sent by a control console. A pixel based gobo image is a gobo (or a projection pattern) created by a light valve like a video projection of sorts. U.S. Pat. No. 5,829,868, issued Nov. 3, 1998 to Hutton, incorporated by reference herein, discloses storing video frames as cues locally in a lamp, and supplying them as directed to an image gate to produce animated and real-time imaging. A single frame can also be manipulated through processing to produce multiple variations. Alternatively, a video communication link can be employed to supply continuous video from a remote source.

IPLDs of the prior art use light from a projection lamp that is sent through a light valve and focused by an output lens to project images on a stage or a projection surface. The control of the various parameters of the IPLDs is affected by an operator using a central controller. In a given application, a plurality of IPLDs are used to illuminate the projection surface, with each IPLD having many parameters that may be adjusted by a central controller to create a scene.

IPLDs used in an entertainment lighting system can produce many colorful images upon the stage or projection surface. IPLDs may project images onto the projection surface such as still images, video images and graphic images. The term "content" is a general term that refers to various types of creative works, including image-type works and audio works. Content is typically comprised of still images, video images or loops and computer graphical images.

The Catalyst (trademarked) DL1 image projection lighting device manufactured by High End Systems of Austin Tex. incorporates a video projector into an environmentally protective housing that can be remotely positioned to projected images to different locations upon the stage or projection surface. A personal computer is used as a server that provides the images to the DL1. A lighting controller sends command signals over a communication system to control the selection of images from the server to the projector as well as control the various functions of the DL1 and the position of the image on the projection surface.

IPLDs may project images such as video images or still images or they may project only light with no image. The projection of images by IPLDs is useful in creating a visual scene on the projection surface that can create an animation or a representation of objects. The projection of only light with no image on the projection surface such as white light or colored light is useful in providing illumination of the projection surface. Most often when illumination of the projection surface without images is required, the intensity of the illumination should be uniform across the projection surface.

U.S. Pat. No. 6,188,933 to Hewlett discloses "Another possible DMD effect is the simulation of a beam field distribution or profile, e.g., a cosine shaped profile for the spotlight." The inventors in Hewlett recognized that spotlights are often overlapped with other spotlights at their edges. The area of overlap can cause a bright spot at those edges. The DMD is used to form a spotlight with edge portions that have intensities that are lower than the intensity in the center of the beam. The rate of intensity drop off is preferably a cosine function. In this way, when the two edge portions of two spotlights are placed one over the other, the overlap does not appear to be overly bright. However, such variable profiles will not be desired in all situations. A variable brightness profile will be desired in situations where multiple beams will be overlapping at their edges. However, other effects, such as illuminating a gobo, will be better illuminated using flat intensity profiles."

A description of an invention for automatically adjusting the brightness uniformity of a plurality of image projection lighting devices is disclosed in U.S. patent application "IMAGE PROJECTION LIGHTING DEVICES WITH PROJECTION FIELD LIGHT INTENSITY UNIFORMITY ADJUSTMENT" Ser. No. 10/319,366, filed on Dec. 13, 2002, by the inventor Richard S. Belliveau, incorporated by reference herein.

Varying the brightness profile on the projection surface by reducing the amount of light transmitted by or reflected from a light valve of an image projection lighting device is effective however only at the expense of an overall reduction of the light output or lumens onto the projection surface.

SUMMARY OF THE INVENTION

The present invention in one or more embodiments provides an apparatus including an image projection lighting device. The image projection lighting device may be comprised of a base, a yoke, and a lamp housing. The lamp housing may be comprised of a lamp and a first light valve. The image projection lighting device may be further comprised of a communications port, a processing system, and a memory.

In one or more embodiments the image projection lighting device may include a variable homogenizing system. The variable homogenizing system may homogenize light projected by the lamp across the first light valve. The variable homogenizing system may vary the light across the light valve from an existing state to a first state or from an existing state to a second state. The variable homogenizing system may be comprised of one or more lens arrays, which may be comprised of cylindrical or spherical lenses. The communications port of the image projection lighting device can receive a command to vary the variable homogenizing system from the existing state into the first state.

A stand-alone control system may be provided. The stand-alone control system can receive a command to vary the variable homogenizing system from the existing state into the first state. The communications port can receive a first operating address and the first operating address can be compared to a second operating address contained in the memory of the image projection lighting device. The communications port can receive a command to vary the variable homogenizing system from an existing state to a first state or second state.

The variable homogenizing system may vary the uniformity of the light projected by the lamp across the first light valve. An actuator may be provided to vary the variable homogenizing system. The actuator may be controlled by signals sent from a motor control system.

BRIEF DESCRIPTION OF THE DRAWINGS

FIG. 4A shows a top view of a cylindrical lens array;

FIG. 4B shows a side view of a homogenizing system including the cylindrical lens array of FIG. 4A;

FIG. 6A shows a variable homogenizing system positioned to vary the homogeneity of light emitted by a lamp to a first state;

FIG. 6B shows the variable homogenizing system of FIG. 6A positioned to vary the homogeneity of the light emitted by a lamp to a second state;

DETAILED DESCRIPTION OF THE DRAWINGS

Figure 1:
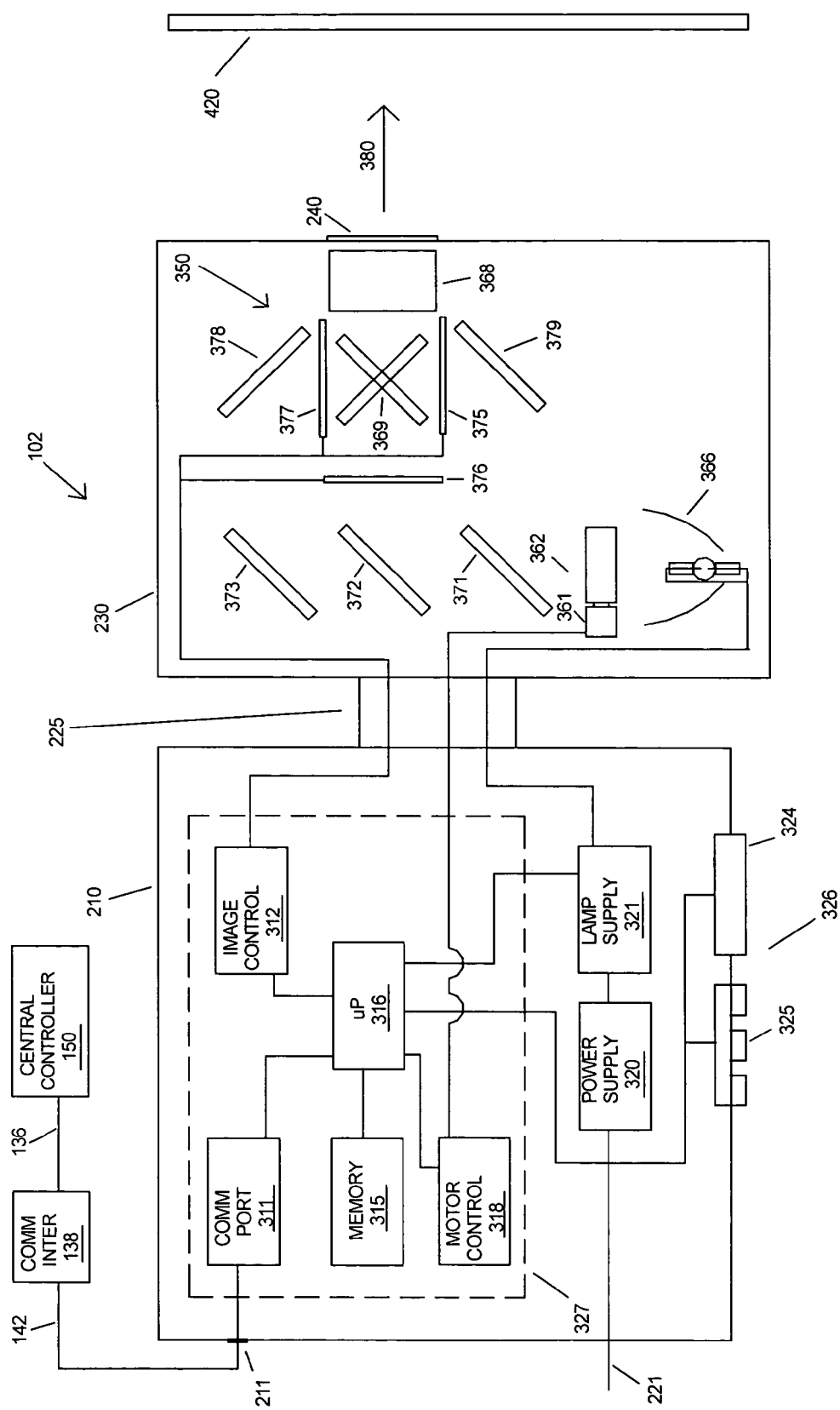
FIG. 1 shows a lamp housing, a base housing and the components therein for an image projection lighting device ("IPLD") in accordance with an embodiment of the present invention.

In the description that follows, like parts are marked throughout the specification and drawings with the same reference numerals, respectively. The drawing figures are not necessarily to scale. Certain features of the invention may be shown exaggerated in scale or in somewhat schematic form and some details of conventional elements may not be shown in the interest of clarity and conciseness. The present invention is susceptible to embodiments of different forms. There are shown in the drawings, and herein will be described in detail, specific embodiments of the present invention with the understanding that the present disclosure is to be considered an exemplification of the principles of the invention, and is not intended to limit the invention to that illustrated and described herein. It is to be fully recognized that the different teachings of the embodiments discussed below may be employed separately or in any suitable combination to produce the desired results.

FIG. 1 is a block diagram of an embodiment of the present invention showing components within or part of the base housing 210 and within or part of the lamp housing 230 of IPLD 102. FIG. 1 also shows the central controller 150. An electronic control system 327 can be contained in the base housing 210. The electronic control system 327 is comprised of at least a processing system such as processor 316. The processor 316 may be made up of discrete electronic parts or the processor 316 may be made up of several processors. The components within or part of the base housing 210 include a communications port (shown as "comm port") 311, a connection point 211, an image control 312, a memory 315, a microprocessor or processor 316, a motor control 318, a power supply 320 and a lamp power supply 321. A bearing 225 is shown rotatably connecting the lamp housing 230 to the base housing 210, in FIG. 1, i.e. bearing 225 connects the lamp housing 230 to the base housing 210 so that the lamp housing 230 can rotate with respect to the base housing 210. Although only one bearing 225 is shown for simplification more than one bearing may rotatably connect the lamp housing 230 to the base housing 210. A display device 324 is also shown within or connected to the base housing 210. The display device 324 may be a display for alphanumeric characters or a video display capable of displaying video images. The display device 324 may also be a touch screen display that accepts input commands. An input keypad 325 is also shown within or connected to the base housing 210. The input keypad 325 together with the display device 324 can be called a stand-alone control system 326. The stand-alone control system 326 can be used to enter data and or to control the parameters of the IPLD 102. The stand-alone control system may only be comprised of the display device 324.

The components within or part of the lamp housing 230 include the lamp 366 that projects a white light to a variable homogenizing system 362. The variable homogenizing system 362 is located to vary the homogeneity of the light produced by the lamp 366 before it is acted upon by the light valves 375, 376 and 377. The variable homogenizing system 362 may be operated to vary the homogeneity of the light being emitted from the lamp 366 by a motor or actuator 361. The motor may be sent driving signals by the motor control system 318. The variable homogenizing system 362 may be constructed of one or more lens arrays and the lenses of the arrays may be spherical or cylindrical or use a combination of both shapes. One manufacturer of lens arrays is Thermo Oriel (trademarked) of Stanford Conn. At least two lens arrays may be used with the first lens array being used to condense the light emitted from the lamp 366 and the second lens array being used to collimate the condensed light created by the first lens array. Either of the first or the second lens arrays may also be called a fly's eye lens. Although only one motor 361 is shown for automating the variable homogenizing system 362, several motors may be used.

The light homogenized by the variable homogenizing system 362 is directed towards a red color separation filter 371. The red color separation filter 371 reflects red light from the white light created by the lamp 366 and the variable homogenizing system 362 to a reflecting mirror 379 where it is directed to a red light valve 375 and the imaged red light passes to a color combining system 369. Blue green light passes though the red color separation filter 371 and is directed to a green color separation filter 372 that in turn reflects green light to a green light valve 376 that passes imaged green light to the color combining system 369. The green separation filter 372 passes blue light that is sent to a blue separation filter 373 and the blue light is reflected off the blue separation filter 373 and passed to a reflector 378. The reflector 378 reflects the blue light to a blue light valve 377 where the imaged blue light is directed to the color combining system 369. The order of the color separation filters may be different. Color combining system 369 combines the imaged red, green and blue light that has been imaged by the red, green and blue light valves 375, 376 and 377 respectively and passes the multicolored lighted images to a zoom and focus lens 368 where it is directed through the aperture 240 in the direction of arrow 380 to the projection surface 420. The red, blue and green light valves 375, 376 and 377 respectively, are controlled to produce images by the image control 312. The image control 312 can be a video graphics card with a memory and a graphics processor.

The central controller 150 outputs address and control commands over a communications system, which may include communications interface 138. The communications interface 138 is connected to the communications port 311 by communications line 142 and connection point 211 as shown in FIG. 1. The communications port 311 may be a part of the processor 316. The communications port 311 can be any device capable of receiving the communication sent over the communications system. The communications interface 138 may be a router or hub as known in the communications art. The communications interface 138 may not be required for some communications systems.

The image control 312 of the electronics housing 210 provides control signals to the light valves 375, 376, and 377 in the lamp housing 230. The microprocessor 316 in the electronics housing 210 provides control signals to the image control 312. The microprocessor 316 is shown electrically connected to the memory 315. The memory 315 stores the software operating system for the IPLD 102 and possibly different types of electronic image content used to form pixel mapped images at the image control 312. The pixel-mapped images are used by the image control to provide the control signals to the light valves 375, 376 and 377. The light valves shown as 375, 376 and 377 are shown as transmissive type light valves where light from the projection lamp 366 is directed to the light valves to be transmitted through the light valves 375, 376 and 377 to the lens 368. As known in the prior art, a light valve can be a reflective light valve where light from the projection lamp 366 is directed to the light valves 375, 376 and 377 to be reflected from the light valves 375, 376, and 377 to the lens 368.

The motor control 318 is electrically connected to the motors or actuators such as the motor actuator 361 The electrical connection to all the motors is not shown for simplification. The motors may be stepping motors, servomotors, solenoids or any other type of actuators. The motor control 318 provides the driving signals to the motors that may be used with the lens 368, the variable homogenizing system actuator 361 and for pan and tilt motors (not shown for simplification).

The motor control 318 is electrically connected to receive control signals from the microprocessor 316. Two power supplies are shown in FIG. 1. A power supply 320 is shown for supplying energy to the motors and may also supply power to the electronic components. A lamp power supply 321 is shown for supplying power to the main projection light source or lamp 366. The lamp power supply 321 may be signaled by the processor 316 to control the lamp 366 to be on, off or vary the power to the lamp. The lamp power supply 321 may send signals to the processor 316 as to the condition of the lamp such as on, off or if there is a fault condition. The processor 316 may keep track of the number of hours that the light source or lamp 366 is illuminated so that data representing the total hours of illumination of the lamp 366 can be stored in the memory 316.

The IPLD 102 may include at least two different housings, such as the base or electronics housing 210 and the lamp housing 230 to facilitate remote positioning of the lamp housing 230 in relation to the base housing 210. The lamp housing 230 contains the optical components used to project light images upon a stage or projection surface 420 from the lens 368 in the direction of arrow 380, outwards from the IPLD 102. The lamp housing 230 may be connected to a bearing mechanism 225 that facilitates pan and tilting of the lamp housing 230 in relation to the base or electronics housing 210. The bearing mechanism 225 is shown simplified. The motors that would be used for pan and tilt are not shown for simplification.

Figure 2:
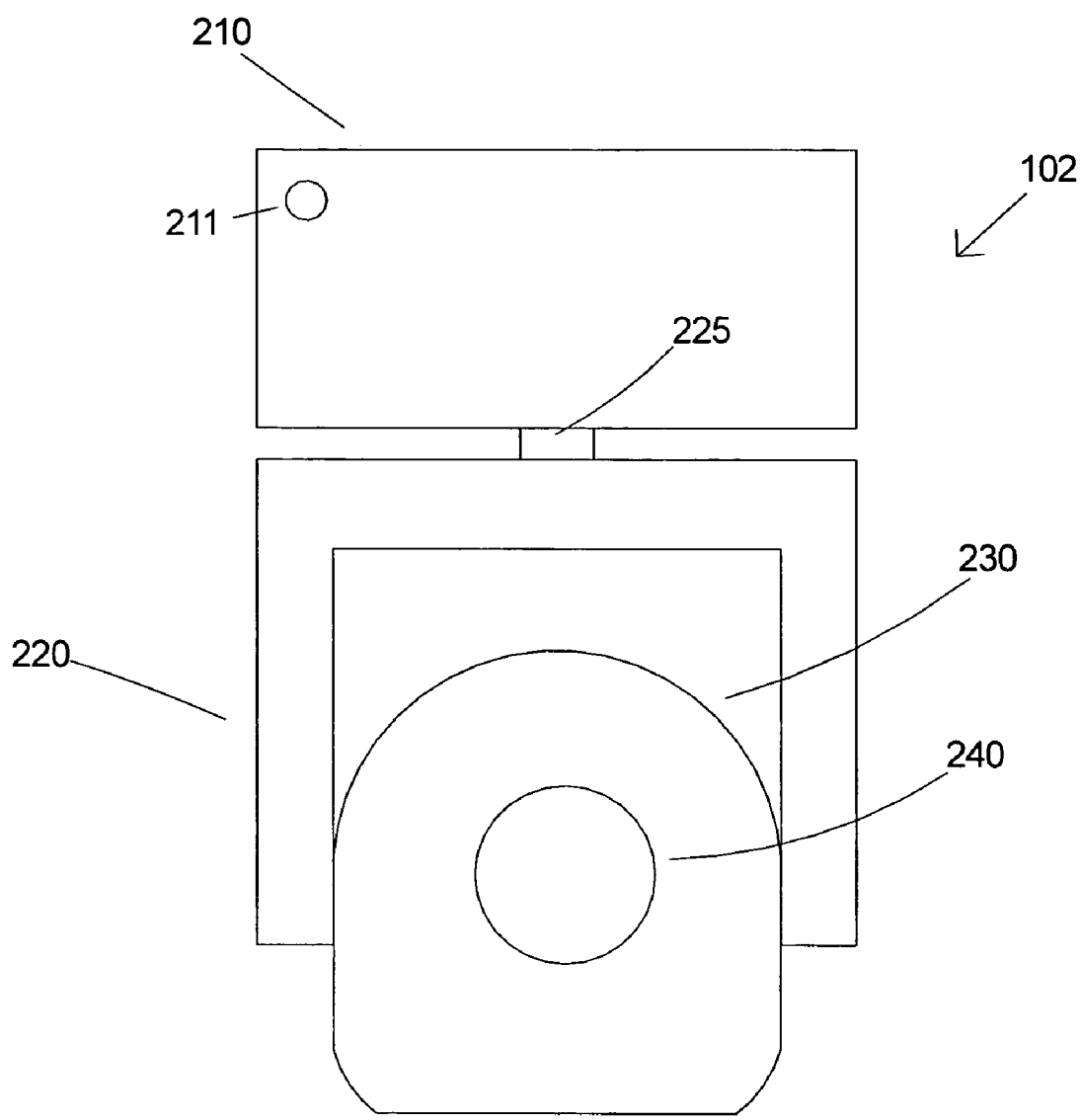
FIG. 2 shows an external view of the image projection lighting device.

FIG. 2 shows a front view of an image projection lighting device 102 incorporating one or more embodiments of the present invention. The IPLD 102 includes a base or electronics housing 210, a yoke 220, and a lamp housing 230. The IPLDs 102 and 104 of FIG. 3 may each be identical to the IPLD 102 of FIG. 2.

Figure 3:
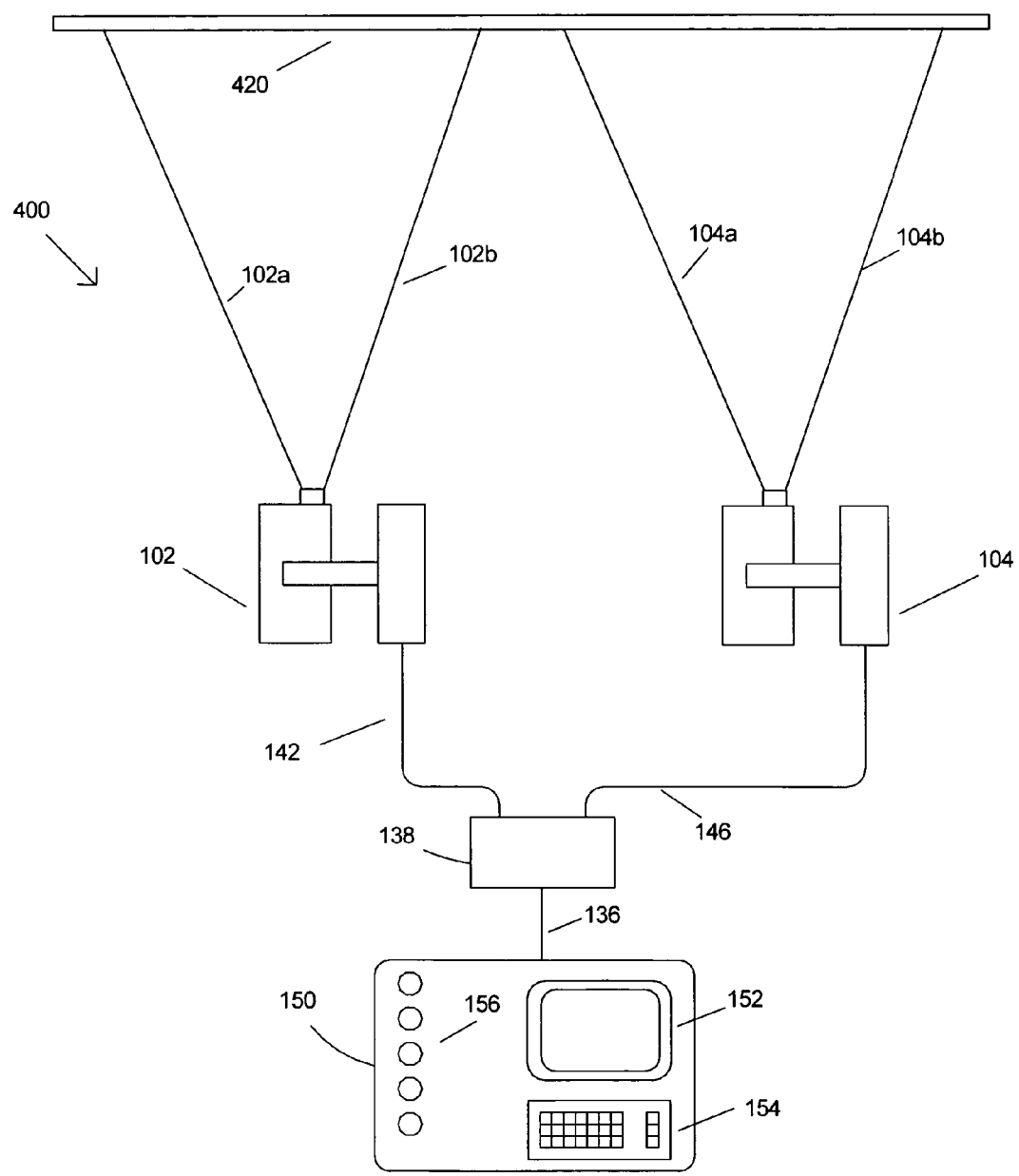
FIG. 3 shows a lighting system using two IPLDs of an embodiment of the present invention and a central controller.

The base housing 210 of the IPLD 102 includes a communications connection 211 for electrically connecting a communications line, such as communications line 142 shown in FIG. 3. The yoke 220 is physically connected to the housing 210 by a bearing 225, which allows the yoke 220 to pan or rotate in relation to the base or electronics housing 210. The lamp housing 230 is rotatably connected to the yoke 220 (bearings not shown for simplification). The lamp housing 230 typically contains optical components and light valves. An exit aperture 240 is shown for projecting lighted images from a projection lamp, such as a lamp 366 shown in FIG. 1. The projection lamp 366 shown in FIG. 1 is shown as a single lamp but it is known in the art to use two or more projection lamps working as a single projection lamp. IPLD 102 is shown with a separate base housing 210 and a lamp housing 230, however it is known in the art to produce an IPLD with a single housing using a mirror to position the projected light.

FIG. 3 shows a lighting system 400 that includes IPLDs 102 and 104. IPLDs 102 and 104 may each be functionally the same as IPLD 102 shown in FIGS. 1 and 2. Although only two IPLDs are shown for the lighting system 400 as many as one hundred or more IPLDs can be used to create a show. The central controller 150 has a keyboard entry device 154 and input devices 156 to allow an operator to input commands for controlling the IPLDs 102 and 104. The central controller 150 has a visual display monitor 152 so the operator can see the details of the show that the operator programs on the central controller 150.

Lines 102a and 102b of FIG. 3 represent the projection field of IPLD 102 as lighting images are projected upon the projection surface 420. Lines 104a and 104b of FIG. 3 represent the projection field of IPLD 104 as lighting images are projected upon the projection surface 420.

The commands entered by the operator of the central controller 150 are sent over a communications system using communications lines 136, 142, 146 and communications interface 138 to the IPLDs 102 and 104 of FIG. 3. Each IPLD has an operating address that is different than the operating address of other IPLDs so that the operator can command a specific IPLD from a plurality of IPLDs. The operating address of a specific IPLD can be stored in the memory 315 or stored as a function of the input keypad 325. The desired operating address of a specific IPLD the operator wishes to control is input into the central controller 150 by inputting to the keyboard 154 or other input device of the central controller 150. The desired operating address is sent over the communication system by the central controller 150 where it is received by the plurality of IPLDs 102 and 104. A receiving IPLD, such as IPLD 102, receives the desired operating address at the communications port 311 of FIG. 1. The received operating address is compared with the operating address stored in the memory 315 of FIG. 1 and if the received operating address matches the operating address stored in the memory 315, of IPLD 102, for example, then next the IPLD 102 is ready to receive commands from the central controller 150. Once the desired IPLD has been addressed by the operator of the central controller 150 the operator may next send commands to select a first image or vary the other parameters of the addressed IPLD. One of the parameters varied may be a uniformity parameter. The images that are selected by the operator that can be projected by the IPLD 102 can originate from the central controller 150 or the content may originate from the memory 315 of FIG. 1.

A description of the operation of communication systems for image projection lighting devices can be found in U.S. Pat. No. 6,605,907 titled "Method, apparatus and system for image projection lighting" issued Aug. 12, 2003 and U.S. Pat. No. 6,331,756 titled "Method and apparatus for digital communications with multiparameter light fixtures" issued on Dec. 18, 2001 inventor Richard S. Belliveau, each incorporated by reference herein.

FIG. 4A shows a top view of a cylindrical lens array 400a. FIG. 4B shows a side view of the cylindrical lens array 400a and a side view of a cylindrical lens array 400b. The lens array 400a and the lens array 400b may make up homogenizing system 400. Sections 400a and 400b may be constructed similarly.

Figure 5A:
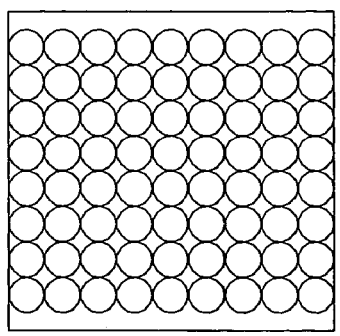
FIG. 5A shows a top view of a spherical lens array.
Figure 5B:
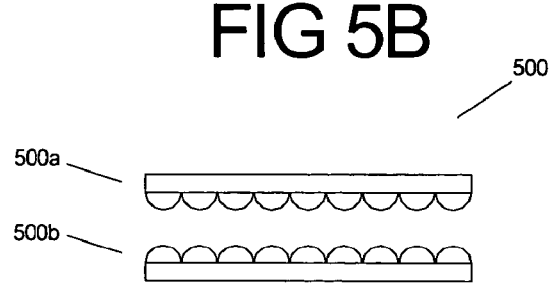
FIG. 5B shows a side view of a homogenizing system including the spherical lens array of FIG. 5A.

FIG. 5A shows a top view of a spherical lens array 500a. FIG. 5B shows a side view of the spherical lens array 500a and a side view of a spherical lens array 500b. The lens array 500a and the lens array 500b may make up homogenizing system 500. Sections 500a and 500b may be constructed similarly. FIG. 6A shows further details of the variable homogenizing system 362. The variable homogenizing system 362 is constructed of homogenizing systems 400 for FIG. 4B and 500 of FIG. 5B. A motor or actuator 361 is comprised of a lead screw assembly 361a for linear movement of the homogenizing systems 400 and 500. Homogenizing systems 400 and 500 may be bonded together in any suitable way such as optical cement. The lead screw assembly 361a may attach to the homogenizing systems 400 and 500. The lead screw assembly 361a in conjunction with the motor 361 can change the position of the homogenizing systems 400 and 500 with reference to the lamp 366.

FIG. 6A shows arrows 366a and 366b representing light projected by the lamp 366. Arrows 366c and 366d represent light from the lamp 366 that has been homogenized to a first state by use homogenizing system 400.

FIG. 6B shows the lead screw assembly 361a in a different state pushing the homogenizing system 400 out of the path of the light from the lamp 366 as represented by the arrows 366a and 366b. FIG. 6B shows that homogenizing system 500 is now positioned in the path of the light from the lamp 366 as represented by arrows 366a and 366b. Arrows 366e and 366f represent light from the lamp 366 that has been homogenized to a second state by use of homogenizing system 500.

As known in the art, most light valves either reflective, transmissive have an aspect ratio of 4:3. When an IPLD projects images on a stage or other projection surface an image in an aspect ratio of 4:3 may not always be desirable. Sometimes it is desirable to project a circular image. When a light valve of a 4:3 aspect ratio is used to project a round image the areas to the outside of the circular image of the light valve are in a light blocking state. Unfortunately a large portion of the light projected toward the 4:3 aspect ratio light valve is wasted when projecting round images.

The homogenizing system 400 of FIG. 4B is used for shaping the light projected by the lamp 366 into a rectangular pattern of light with good uniformity or homogeneity across the light valve 375 of FIG. 1. The homogenizing system 500 of FIG. 5B is used for shaping the light projected by the lamp 366 into a circular pattern of light with good uniformity or homogeneity within the light valve 375.

Figure 7A:
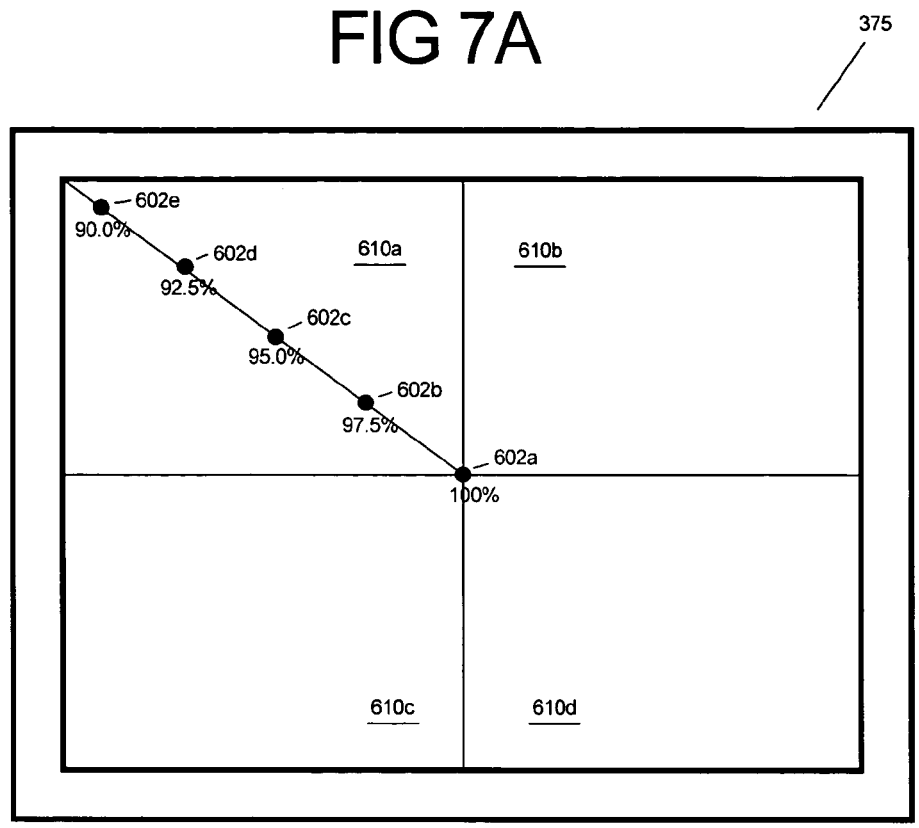
FIG. 7A shows a front view of the surface of a light valve with a first light distribution.

FIG. 7A shows light valve 375 with six reference points 602a, 602b, 602c, 602d, 602e, and 602f that indicate the percentage of light intensity across the light valve 375 when the variable homogenizing system 362 of FIG. 6A is in a first state. The light valve 375 is shown divided into four quadrants 610a, 610b, 610c and 610d. Only the illumination uniformity of quadrant 610a is shown for simplification however the illumination uniformity of quadrants 610b, 610c and 610d would be similar to that of quadrant 610a. The homogeneity of the light across light valve 375 is created by the homogenizing system 400 of the variable homogenizing system 362 as shown in FIG. 6A while the variable homogenizing system 362 is in the first state. The light projected by the lamp 366 and homogenized by the variable homogenizing system 362 in the first state allows for good uniformity of the light across the 4:3 aspect ratio light valve 375.

Figure 7B:
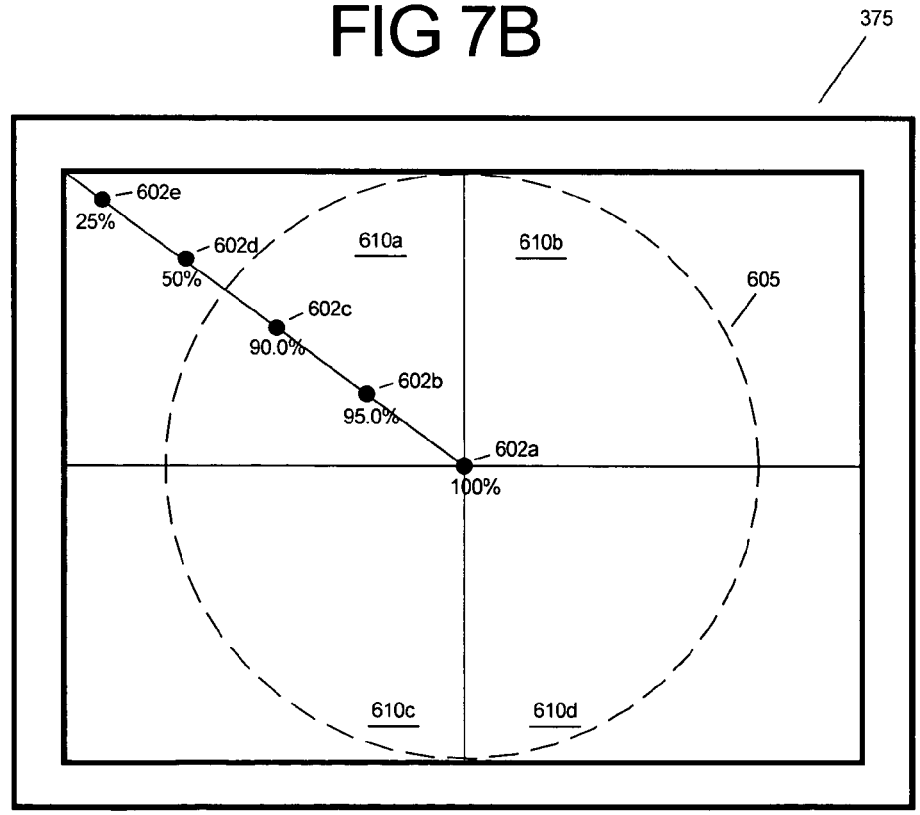
FIG. 7B shows the light valve of FIG. 7A but with a second light distribution.

FIG. 7B shows light valve 375 with six reference points 602a, 602b, 602c, 602d, 602e, and 602f that indicate the percentage of light intensity across the light valve 375 when the variable homogenizing system 362 of FIG. 6B is in the second state. The light valve 375 is shown divided into four quadrants 610a, 610b, 610c and 610d. Only the illumination uniformity of quadrant 610a is shown for simplification however the illumination uniformity of quadrants 610b, 610c and 610d would be similar to that of quadrant 610a. The homogeneity of the light across light valve 375 is created by the homogenizing system 500 of the variable homogenizing system 362 as shown in FIG. 6B while the variable homogenizing system 362 is in the second state. A dashed circular line is shown within the light valve 375 of FIG. 7B. When an IPLD such as IPLD 102 projects a circular image, the area inside of the dashed circular line 605 is used to form the projected image. The remaining area across the light valve 375 that is shown outside of the circular line 605 is not used for the projection of light by the IPLD 102. With the variable homogenizing system 362 in the second state as shown by FIG. 6B the uniformity of the light projected by the lamp 366 is varied from the uniformity shown by FIG. 6A. More of the light projected by the lamp 366 is contained within the dashed circular line 605 and less of the light projected by the lamp 366 is wasted to the areas outside of the dashed circular line 605. Since the brightness across the light valve 375 drops off rapidly outside of the dashed circular line 605 when the variable homogenizing system 362 is in the second state there is an improvement to the black levels to those areas outside of the dashed circular line 605 when the IPLD, such as IPLD 102, projects only a circular image.

An operator of the central controller 150 of FIG. 3 may enter a command by using the keyboard or entry device 154 or input devices 156 to vary the variable homogenizing system of an IPLD such as variable homogenizing system 362 of the IPLD 102. First the operator enters the correct operating address of the IPLD 102 followed by a vary homogeneity (also can be referred to as vary uniformity) command. The address and command is sent over the communications system, which may be comprised of lines 136, communications interface 138 and lines 142 and 146. If the IPLD 102 receives the correct address, it will next respond to the vary homogenizing system command. Since the operating address of the IPLDs 102 and IPLD 104 can be different, each IPLD may vary the states of it's associated variable homogenizing system as desired.

When an operator wishes to project a rectangular image onto the projection surface 420 of FIG. 3 from the IPLD 102, the operator may input a command to the central controller 150 to place the variable homogenizing system 362 into a first state as shown by FIG. 6A.

When an operator wishes to project a round image onto the projection surface 420 of FIG. 3 from the IPLD 102, the operator may input a command to the central controller 150 to place the variable homogenizing system 362 into a second state as shown by FIG. 6B.

An operator may also vary the variable homogenizing system 362 of the IPLD 102 by inputting the appropriate commands into the stand-alone control system 326 shown in FIG. 1

The variable homogenizing system 362 is shown preferably constructed of cylindrical lenses and spherical lens arrays. The variable homogenizing system 362 may also be constructed of only cylindrical lens components that can be rotated perpendicular to each other to create a circular light distribution. Although the variable homogenizing system 362 is shown linearly actuated, it is possible to vary the position of lens arrays, such as the lens arrays 400a, 400b, 500a or 500b into the light path using an indexing wheel. It is also possible to remotely position the lenses or lens arrays in relation to each other and the lamp 366 with the result of changing the magnification.

Figure 8A:
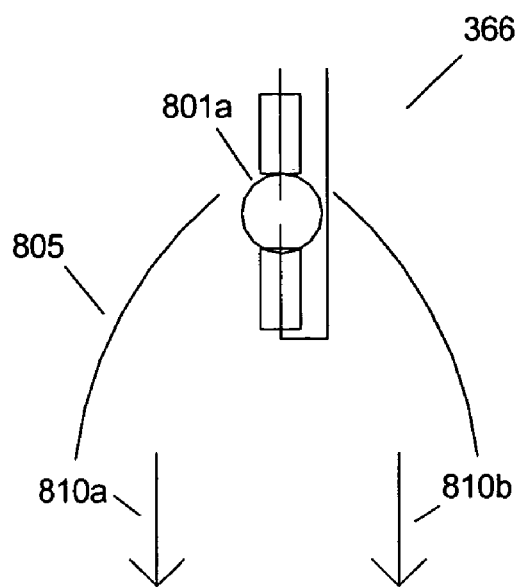
FIG. 8A shows a lamp with a plasma light source located in a first position.
Figure 8B:
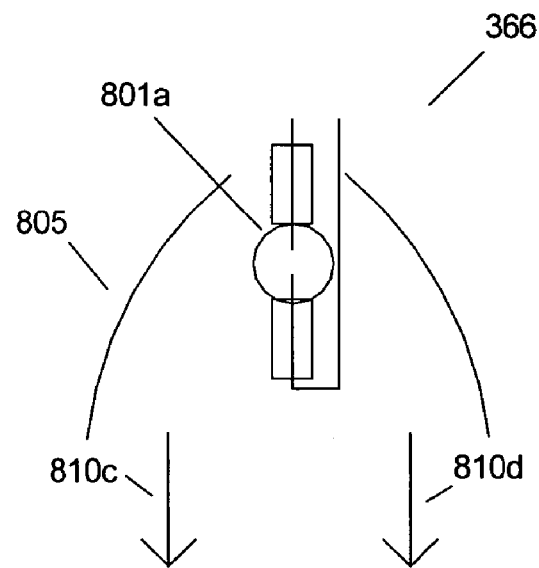
FIG. 8B shows the lamp with the plasma light source of FIG. 8A located in a second position.

It is further possible to change the location of plasma light source or light source located in the lamp reflector thus varying the light uniformity across the light valve. FIG. 8A shows a plasma light source 801a of the lamp 366 located in a first position in reference to a lamp reflector 805. Arrows 810a and 810b represent the light projected by the lamp 366 with the plasma light source 801a in the first position with reference to the lamp reflector 805. FIG. 8B shows the plasma light source 801a of the lamp 366 located in a second position in reference to the lamp reflector 805. Arrows 810c and 810d represent the light projected by the lamp 366 with the plasma light source 801a in the second position with reference to the lamp reflector 805.

I claim:
1. A stage lighting apparatus comprising
an image projection lighting device comprising:
   a base;
   a lamp housing;
   wherein the lamp housing is remotely positioned in relation to the base by a motor;
   the lamp housing comprising
      a lamp;
      and a first light valve;
      and a variable homogenizing system;
      wherein the lamp creates a first light that is directed toward the variable homogenizing system;
      and wherein the variable homogenizing system homogenizes the first light to create a second light.

2. The stage lighting apparatus of claim 1
wherein the second light is directed towards the first light valve.

3. The stage lighting apparatus of claim 2
wherein the variable homogenizing system varies the second light across the light valve from an existing state to a first state.

4. The stage lighting apparatus of claim 3
wherein the variable homogenizing system varies the second light across the light valve from the existing state to a second state.

5. The stage lighting apparatus of claim 3 further comprising
   a communication port;
   wherein the communications port receives a command to vary the variable homogenizing system from the existing state into the first state.

6. The stage lighting apparatus of claim 3 further comprising
   a stand-alone control system;
wherein the stand-alone control system receives a command to vary the variable homogenizing system from the existing state into the first state.

7. The stage lighting apparatus of claim 3 wherein
   the variable homogenizing system is comprised of one or more lens arrays.

8. The stage lighting apparatus at claim 7 wherein
   at least one of the one or more lens arrays is comprised of a plurality of cylindrical lenses.

9. The stage lighting apparatus of claim 7 wherein
   at least one of the one or more lens arrays is comprised of a plurality of spherical lenses.

10. A stage lighting apparatus comprising
an image projection lighting device comprising:
   a communication port;
   a processor;
   a memory;
   a base;
   a lamp housing;
   wherein the lamp housing is remotely positioned in relation to the base by a motor;
   the lamp housing comprising
      a lamp,
      and a first light valve;
      and a variable homogenizing system;
      wherein the communication port receives a first operating address and wherein the first operating address can be compared to a second operating address contained in the memory of the image projection lighting device;

wherein the communication port receives a command to vary the variable homogenizing system; from an existing state to a first state.

11. The stage lighting apparatus of claim 10 wherein the variable homogenizing system is comprised of two different lens types.

12. The stage lighting apparatus of claim 10 wherein the variable homogenizing system varies the uniformity of the light projected by the lamp across the light valve.

13. The stage lighting apparatus of claim 12 further comprising
an actuator and
wherein the variable homogenizing system is varied by an actuator.

14. The stage lighting apparatus of claim 13 further comprising
a motor control system and
wherein the actuator is varied by signals sent by the motor control system.

15. A stage lighting system comprising
a plurality of image projection lighting devices;
and a central controller;
wherein each of the image projection lighting devices comprises:
a base;
a communication port;
and a lamp housing;
wherein the lamp housing is remotely positioned in relation to the base by a motor;
the lamp housing comprising:
a lamp;
and a light valve; and
each of the image projection lighting devices further comprising
a processing system;
a memory;
and a device for creating variable uniformity of light intensity across the light valve;
wherein each of the plurality of image projection lighting devices have a uniformity of light intensity across its light valve varied independently by a command received over the communication port from the central controller.

16. The stage lighting system of claim 15 wherein the variable uniformity of light intensity across the light valve is created by a variable homogenizing system and the variable homogenizing system varies the light intensity across the light valve from an existing state to a first state.

17. The stage lighting system of claim 16 wherein the variable homogenizing system is comprised of a first and a second type of lens.

18. The stags lighting system of claim 17 wherein the first type of lens is cylindrical;
the second type of lens is spherical.

* * * * *